United States Patent [19]

Roberts et al.

[11] 4,353,437

[45] Oct. 12, 1982

[54] ADJUSTER FOR DRUM BRAKES

[75] Inventors: James K. Roberts; Donald D. Johannesen, both of South Bend, Ind.

[73] Assignee: The Bendix Corporation, Southfield, Mich.

[21] Appl. No.: 180,533

[22] Filed: Aug. 22, 1980

[51] Int. Cl.³ ............................................. F16D 65/46
[52] U.S. Cl. ........................ 188/79.5 GE; 188/196 BA; 188/340
[58] Field of Search .................. 188/79.5 GE, 79.5 K, 188/79.5 R, 196 BA, 79.5 P, 340

[56] References Cited

U.S. PATENT DOCUMENTS

| | | | |
|---|---|---|---|
| 2,938,610 | 5/1960 | Dombeck et al. | 188/196 BA |
| 3,114,438 | 12/1963 | Helvern | 188/196 BA |
| 3,358,794 | 12/1967 | Ayers, Jr. | 188/196 BA |
| 3,556,262 | 1/1971 | Dombeck | 188/196 BA |

Primary Examiner—Edward R. Kazenske
Assistant Examiner—R. R. Diefendorf
Attorney, Agent, or Firm—Ken C. Decker; Paul David Schoenle

[57] ABSTRACT

A drum brake (10) includes a rotatable brake drum (16) and a pair of brake shoes (12, 14) which are engageable with the brake drum. A non-rotatable backing plate (24) slidably carries the pair of brake shoes. The brake shoes pivotally anchor at one end to a pin (32) secured to the backing plate. An extendible member (36) adjustably spaces apart the other ends of the brake shoes to maintain a desired running clearance between the brake shoes and the brake drum. One of the brake shoes carries a lever (48) which drivingly engages a ratchet wheel (46) of the extendible member. The lever carries a pin (60) which is slidably and rotatably received in an arcuate guide slot (58) of the backing plate. A brake application with forward brake drum rotation causes the lever to slide along the arcuate slot and to remain substantially stationary relative to the extendible member. A reverse brake application causes the one brake shoe to shift in a direction nearly perpendicular to the arcuate guide slot so that the lever is pivoted relative to the extendible member. The lever engages with a successive tooth of the ratchet wheel if the running clearance of the brake is greater than the desired value. An adjustment of the extendible member is effected to diminish the running clearance of the brake to the desired value.

2 Claims, 3 Drawing Figures

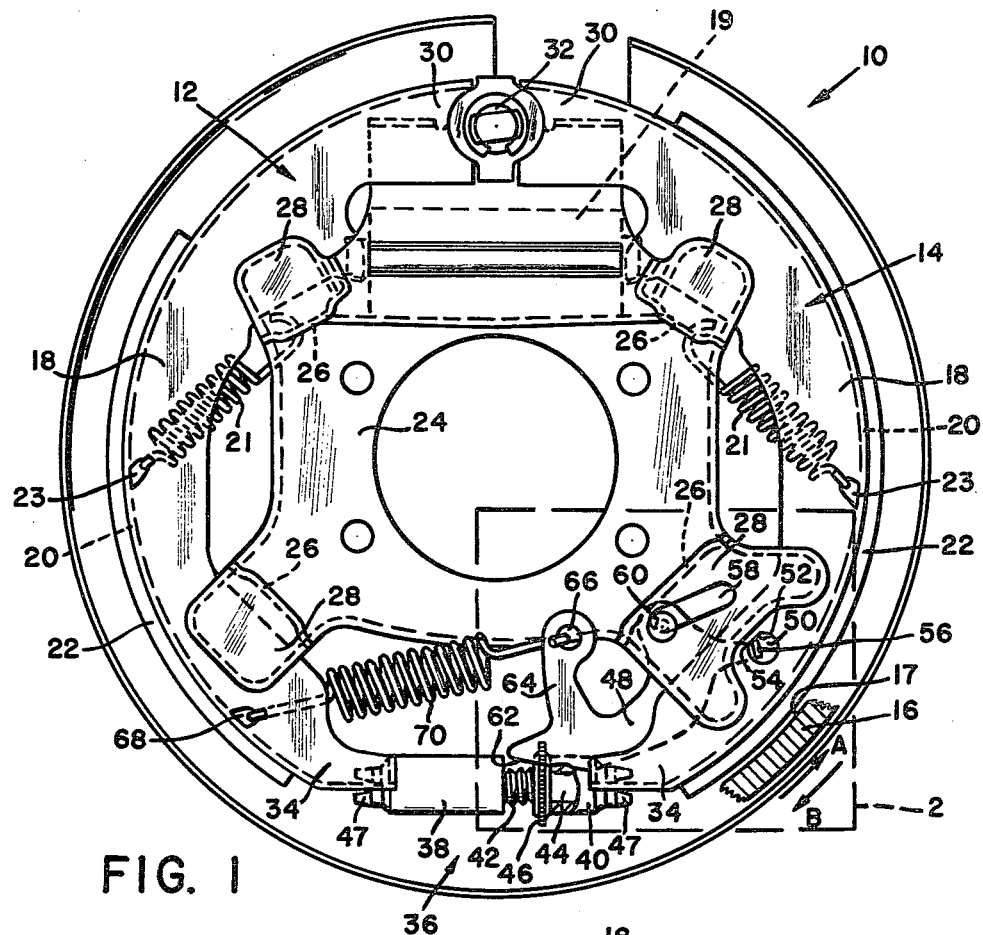
FIG. 1
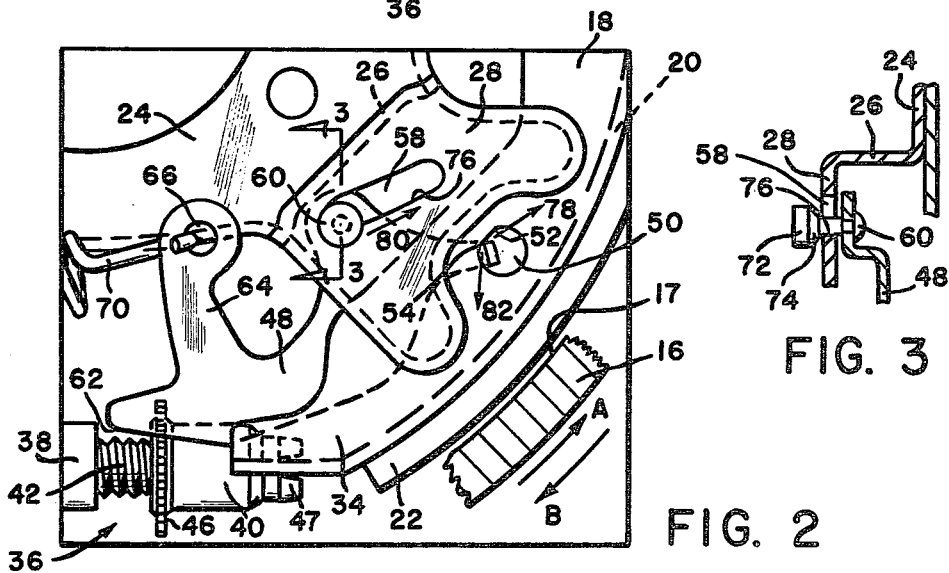
FIG. 2
FIG. 3

ADJUSTER FOR DRUM BRAKES

The invention relates to an adjuster for a servo type of drum brake. The adjuster includes a lever connected at a pivot point to one of the pair of brake shoes of the brake. A pawl is defined by the lever and drivingly engages a ratchet wheel of an extendible member. The extendible member cooperates with the pair of brake shoes to adjustably space apart the shoes and to maintain a running clearance between the brake shoes and the brake drum. The lever includes means for pivoting the lever relative to the one brake shoe so that the pawl engages a successive tooth of the ratchet wheel if the running clearance of the brake is above a predetermined value. Adjustment of the extendible member takes place only upon a brake application with the brake drum rotating in one direction of rotation. No adjustment results when a brake application is effected with the brake drum rotating in the opposite direction.

Drum brakes of the servo type include a brake drum and a pair of arcuate brake shoes carried at their one end by an anchor pin secured to a backing plate of the brake. An extendible member cooperates with the ends of the brake shoes opposite from the anchor pin to adjustably space apart the brake shoes and to maintain a running clearance between the brake shoes and the brake drum. A hydraulic actuator is interposed between the brake shoes near the anchor pin and is effective upon being supplied with a pressurized fluid to separate the brake shoes and to urge them into engagement with the brake drum. Depending upon the direction of brake drum rotation, when a brake application is effected one of the brake shoes engages the brake drum and is frictionally pulled away from the anchor pin. Brake torque generated by the one shoe is transferred to the extendible member and to the other brake shoe, forcefully pivoting the other brake shoe at the anchor pin and urging it into engagement with the brake drum. Thus, brake torque developed by both brake shoes is transferred by the other brake shoe to the anchor pin. When brake drum rotation is in the opposite direction and a brake application is effected, the roles of the brake shoes are reversed and the one brake shoe pivots at the anchor pin because of brake torque transferred by the extendible member from the other brake shoe. Thus, it will be understood that in a servo brake, braking torque developed by one brake show is used to apply the other brake show to the brake drum.

A servo drum brake is known in accordance with the U.S. Pat. No. 2,938,610 to Dombeck et al in which an adjuster for the extendible member includes a lever pivotally connected to the one brake shoe near an extendible member. The lever drivingly engages a ratchet wheel of the extendible member. A coil spring connects the free end of the lever to the other brake shoe and urges the brake shoes into engagement with the extendible member. The coil spring also resiliently pivots the lever in a direction elongating the extendible member. A linkage connects the lever to a stationary anchor part of the brake so that when a brake application is effected with the brake drum rotating in a direction causing the one brake shoe to be frictionally pulled away from the stationary anchor part, the lever is pivoted relative to the one brake shoe. If the friction material carried by the brake shoes has worn sufficiently to require an adjustment, the lever engages a successive tooth of the ratchet wheel and an adjustment of the extendible member is effected.

With an adjuster of the kind shown in the Dombeck patent, a multiplicity of component parts are required. The manufacturing costs of these many component parts contribute to the cost of the complete brake. The labor costs associated with assembly of the many component parts adds additional expense for the brake. Additionally, when the brake shoes are to be replaced, the multiplicity of component parts adds to the complexity of this maintenance operation and increases its cost by lengthening the time required for its performance.

The invention as claimed is intended to remedy the drawbacks of prior adjusters by providing a servo drum brake with an adjuster in which the number of component parts is substantially reduced. Because of the fewer number of component parts of the adjuster, manufacturing, assembly, and maintenance costs for the brake are reduced. Additionally, the weight of the brake is reduced.

The advantages offered by the invention are mainly that the adjuster is mechanically simple and rugged, light in weight, inexpensive to manufacture, and easy to assemble.

A servo drum brake according to the invention includes a pair of brake shoes designated as a primary shoe and as a secondary shoe. The pair of shoes pivotally anchor at their expansible ends to an anchor pin which is carried by a packing plate of the brake. At their other, or articulate ends, the shoes are spaced apart by an extendible member which is adjustable to maintain a substantially constant running clearance between the brake shoes and the brake drum when the brake is released. A suitable actuator is interposed between the expansible ends of the brake shoes near the anchor pin and serves to separate the expansible ends of the shoes into engagement with the brake drum upon a brake application.

A brake application with a forward rotation of the brake drum results in the secondary brake shoe pivoting about the anchor pin. Thus, all parts of the secondary brake shoe move along arcs, the center of which correspond with the center of the anchor pin. Conversely, a brake application with reverse rotation of the brake drum causes the secondary brake shoe to move circumferentially and to anchor on the primary brake shoe. Consequently, the articulate end of the secondary brake shoe, near the extendible member, moves along a radial and circumferential path which is nearly perpendicular to a tangent of an arc centered at the anchor pin.

A lever is pivotally carried by the secondary brake shoe near the extendible member and defines a pawl which is drivingly engaged with a ratchet wheel of the extendible member. The lever is resiliently biased in a direction tending to cause rotation of the ratchet wheel and extension of the extendible member. The lever also carries a pin which is spaced from the point of pivotal engagement of the lever with the secondary brake shoe. The pin engages an arcuately-shaped slot in the backing plate. A brake application with forward rotation of the brake drum results in movement of the secondary brake shoe and the lever along arcuate paths which are centered at the anchor pin so that no relative movement of the lever relative to the secondary brake shoe and extendible member results because the pin slides in the arcuate backing plate slot. A brake application with reverse rotation of the brake drum causes the arcuate end of the secondary brake shoe to move along a radial and circumferential path. The path followed by the articulate end of the secondary brake shoe is nearly perpendicular to the arcuate slot defined by the backing plate. The lever is carried along with the articulate end of the secondary brake shoe at the point of pivotal connection of the lever with the brake shoe. Because the pin carried by the lever is constrained by the arcuate slot in the backing plate, the pin cannot follow the radial and circumferential movement of the lever. Consequently, because the pin is spaced from the point of pivotal connection of the lever with the secondary brake shoe, the lever is pivoted as the secondary brake shoe moves radially and circumferentially. Thus, the lever is pivoted relative to the extendible member and the pawl defined by the lever may engage with a successive tooth of the ratchet wheel to extend the extendible member if the running clearance between the brake shoes and the brake drum is excessive.

One way of carrying out the invention is described in detail below with reference to drawings which illustrate only one specific embodiment, in which:

FIG. 1 is a view of a drum brake assembly partly in cross-section and embodying our invention.

FIG. 2 is an enlarged view of an encircled portion of FIG. 1.

FIG. 3 is a fragmentary cross-sectional view taken along the line 3—3 of FIG. 2.

The Figures show a drum brake 10 which includes a pair of arcuate brake shoes 12 and 14. A rotatable brake drum 16 defines a friction face 17 with which the pair of brake shoes are engageable. Upon a brake application, the pair of brake shoes 12 and 14 frictionally engage the friction face 17 to retard rotation of brake drum 16. The brake shoes are designated as a primary shoe 12 and as a secondary shoe 14. Each of the brake shoes includes a pair of spaced apart webs 18, (only one of which is visible in the drawing figures), a rim 20 and a friction lining 22. The pair of webs 18 and the rim 20 of each brake shoe 12 and 14 cooperate to define a U-shape in cross-section. The two webs of each brake shoe are identical. Because the webs of each brake shoe are disposed one behind the other in the drawing figures, only one web of each brake shoe is visible in the drawings. A non-rotatable backing plate 24 carries the brake shoes 12 and 14. The backing plate 24 includes four L-shaped hold-down fingers 26. Hold-down fingers 26 extend perpendicularly from the backing plate 24 and terminate in radially-extending portions 28. Brake shoes 12 and 14 are slidably received between the backing plate 24 and the radially-extending portion 28 of hold-down fingers 26.

A hydraulic actuator 19 is carried by backing plate 24 between the expansible ends 30 of the brake shoes 12 and 14. Actuator 19 includes a pair of oppositely acting pistons (not shown) which are operatively connected to the web portions 18 of the brake shoes. A pair of return springs 21 are connected to backing plate 24. The outer ends of return springs 21 are hooked in respective apertures 23 defined by the webs 18 of brake shoes 12 and 14. Apertures 23 are defined by the brake shoe webs 18 which are closest to the viewer. Return springs 21 yieldably bias the expansible ends 30 of the brake shoes 12 and 14 into engagement with an anchor pin 32. Anchor pin 32 is secured to backing plate 24.

The articulate ends 34 of brake shoes 12 and 14 are spaced apart by an adjustable strut or extendible member 36. The adjustable strut 36 includes a tubular internally-threaded nut 38 and a socket 40 which rotatably receive a threaded stem 42 and a non-threaded stem 44, respectively. A ratchet wheel 46 is formed integrally with stems 42 and 44. The periphery of the ratchet wheel includes a multiplicity of circumferentially-arranged teeth. The ends 47 of nut 38 and of socket 40 are slotted to receive the articulate ends 34 of the brake shoes, thus preventing rotation of nut 38 and socket 40.

A lever 48 is pivotally connected to the articulate end 34 of brake shoe 14. The lever 48 is received between the spaced-apart webs 18 of the brake shoe 14. The web 18 of brake shoe 14 which is closest to the viewer defines a D-shaped hole 50. A straight edge portion 52 of hole 50 joins an arcuate portion of the hole at a point 54. A tab 56 extends from lever 48 into hole 50. The tab 56 is generally rectangular in cross-section, viewing FIG. 2, and extends from lever 48 perpendicularly to the plane of the Figure. An upper edge of tab 56 cooperates with the point 54 so that lever 48 is pivotal about the point 54.

An arcuate slot 58 is defined by the radially-extending portion 28 of the hold-down finger 26 which is adjacent to lever 48. Slot 58 coincides in curvature to an arc centered at the anchor pin 32. The lever 48 carries a pin 60 which is slidably received in the arcuate slot 58.

The lever 48 defines a tooth or pawl 62 which is drivingly engaged with ratchet wheel 46. Lever 48 also includes an arm 64 which defines an aperture 66. The web of brake show 12 which is closest to the viewer defines an aperture 68. A coil tension spring 70 is hooked into apertures 66 and 68 so that the spring 70 extends in tension between the arm 64 and the brake shoe 12. The spring 70 cooperates with the lever 48 to resiliently bias the brake shoes 12 and 14 into engagement at their articulate ends 34 with the extendible member 36. Spring 70 also provides a first moment which tends to pivot lever 48 in a plane perpendicular to the plane of FIG. 2 and into driving engagement with the ratchet wheel 46. A second moment is also provided to lever 48 by spring 70. The second moment tends to pivot the lever 48 counter-clockwise in the plane of FIG. 2 so that the lever is pivoted about the point 54.

As is illustrated in FIG. 3, the pin 60 includes an enlarged head 72 which is of a size to pass through the slot 58 and which defines a conically-shaped shoulder 74. The counter-clockwise moment applied to lever 48 by spring 70 causes the pin 60 to slidingly engage the edge 76 of slot 58 and to remain in the slot 58 because of the engagement of the conical shoulder 74 with the edge of slot 58.

When a brake application is effected with rotation of the brake drum in a direction corresponding to forward vehicle travel, as is represented by Arrow A, the brake shoes are separated at their expansible ends by actuator 19. As the expansible end of the primary brake shoe 12 engages the friction face 17 of drum 16, a friction force is created which tends to move brake shoe 12 circumferentially with the brake drum in the direction of arrow A. The friction force, or brake torque, on brake shoe 12 is transferred by the extendible member 36 from brake shoe 12 to the articulate end 34 of the secondary brake shoe 14. Thus, the secondary brake shoe is pivoted radially outward against the brake drum 16. Brake shoe 14 frictionally engages the brake drum and generates additional brake torque. The combination of brake torque generated by brake shoe 14 together with torque transferred to brake shoe 14 from brake shoe 12 via the extendible member causes brake shoe 14 to pivotally anchor on anchor pin 32. As a result, the brake shoe 14 transfers all of the brake torque developed by both brake shoes to the anchor pin 32. Further, the brake shoe 14 is pivoted about the anchor pin 32 and is forced outward against the brake drum 16 by brake torque transferred from the primary brake shoe 12 via the extendible member 36. It will be understood that the expansible end of the primary brake shoe 12 is pulled away from anchor pin 32 by the brake torque developed by the engagement of its friction lining 22 with the rotating friction face 17 of brake drum 16.

Because the secondary brake shoe 14 pivots at its attachment with the anchor pin 32, all parts of the brake shoe 14 move along arcs centered at pin 32. The arcuate movement of the pivot point 54 defined at D-hole 50 is represented by arrow 78 viewing FIG. 2. As the articulate end 34 of the secondary brake shoe 14 swings outward toward the friction face 17 of brake drum 16, the lever 48 is carried along with the brake shoe 14. Pin 60, which is attached to lever 48, slides along the edge 76 of slot 58, as is represented by arrow 80, so that no substantial pivotal movement of lever 48 relative to brake shoe 14 and strut 36 is caused by this swinging movement of the brake shoe 14.

In a similar manner when a brake application is effected with the brake drum 16 rotating in a direction corresponding to reverse vehicle travel, as is represented by arrow B, the roles of the primary and secondary brake shoes are reversed. That is, the secondary brake shoe 14 is separated from anchor pin 32 and torque developed by brake shoe 14 is transferred by strut 36 to the articulate end 34 of primary brake shoe 12. Thus, brake shoe 12 is pivoted about anchor pin 32 and transfers all of the torque developed by both of the brake shoes to the anchor pin 32. At the pivot point 54 defined in D-hole 50, the movement of the secondary brake shoe 14 is circumferential in the direction of arrow B and radially outward, as is represented by arrow 82 viewing FIG. 2. The pin 60 attached to lever 48 cannot follow the movement of pivot point 54 in the direction of arrow 82 because of the arcuate shape of slot 58. Thus, lever 48 is pivoted relative to the brake shoe 14 and strut 36 as the point 54 moves in the direction of arrow 82. If the running clearance between the brake shoes and the friction face 17 of brake drum 16 is above a predetermined value, the pawl 62 of lever 48 engages a successive tooth of the ratchet wheel 46.

Upon completion of the braking phase, the fluid pressure is released from actuator 19, the brake shoes returned to their nonbraking positions, and the strut 36 no longer sustains braking torque. As the force on strut 36 decreases, the counter-clockwise moment applied to lever 48 by spring 70 becomes sufficient to overcome the friction of the threaded stem 42 in nut 38 so that the stem 42 is rotated by the ratchet wheel 46 in a direction which elongates the strut and diminishes the running clearance of the brake to compensate for wear of the friction linings 22. Moreover, the invention maintains a substantially constant running clearance between the pair of brake shoes 12 and 14 and the friction face 17 of brake drum 16. Whenever the brake is applied with a rearward vehicle movement, the adjuster is operable to adjust the running clearance of the brake.

We claim:

1. A drum brake comprising a brake drum and a pair of brake shoes engageable with the drum to retard rotation of said drum, a backing plate carrying said pair of brake shoes and including an anchor means for receiving braking torque from said pair of brake shoes, an extendible member which spaces apart said pair of brake shoes to maintain a running clearance between the brake shoes and the brake drum in the non-braking condition, each of said brake shoes pivotally engaging said anchor means, a lever pivotally connected to one of said brake shoes and engaging said extendible member to elongate said member, resilient means extending between said lever and the other of said pair of brake shoes for urging said pair of brake shoes into engagement with said extendible member, said resilient means yieldably pivoting said lever so as to elongate said extendible member, characterized in that said backing plate and said lever include cooperating means for pivoting said lever relative to said extendible member upon radial and circumferential movement of said one brake shoe relative to said backing plate, whereby a brake actuation with the brake drum rotating in a direction causing said one brake shoe to pivot relative to said anchor means and to transmit braking torque thereto causes said lever to remain substantially stationary relative to said one brake shoe and said extendible member, a brake application with the brake drum rotating in the reverse direction causing said one brake shoe to move radially outwardly and circumferentially in the direction of brake drum rotation, said cooperating means pivoting said lever relative to said extendible member to elongate said extendible member if said running clearance is greater than a predetermined value, said cooperating means including a slot defined by one of said backing plate and lever, said cooperating means further including a pin carried by the other of said backing plate and lever, said pin being slidably received in said slot, and said slot being curved, the curvature of said slot coinciding with an arc centered at the point of pivotal engagement of said one brake shoe with said anchor means.

2. A drum brake comprising a brake drum and a pair of arcuate friction elements engageable with said brake drum to retard the rotation of said brake drum, a backing plate slidably carrying said friction elements, an anchor pin secured to said backing plate, said friction elements pivotally anchoring at one end thereof to said anchor pin, means for separating the anchored ends of said friction elements and urging said friction elements into frictional engagement with said brake drum, an extendible member interposed between the unanchored ends of said pair of friction elements to space apart said friction elements and maintain a running clearance between the friction elements and said brake drum, a lever pivotally attached to one of said friction elements and engaging said extendible member, resilient means extending between said lever and the other of said friction elements for urging said pair of friction elements into engagement with said extendible member; said extendible member including a rotatable ratchet wheel, rotation of which elongates said extendible mmember; said lever defining a pawl drivingly engageable with said ratchet wheel to elongate said extendible member, characterized in that said drum brake includes means for slidably and pivotally connecting said lever to said backing plate, said connecting means limiting the sliding movement of said lever to movement along an arc substantially centered at said anchor pin, whereby said lever remains substantially stationary relative to said extendible member and one friction element upon a brake application causing said one friction element to pivot on said anchor pin, a brake application causing the other friction element to pivot on said anchor pin causing said one friction element to move substantially perpendicularly to an arc centered at said anchor pin so that said lever is pivoted relative to said extendible member, said pawl engaging a successive tooth of said ratchet wheel if the running clearance between said friction elements and said brake drum is greater than a predetermined value, said lever rotating said ratchet wheel upon the termination of said brake application so as to diminish said running clearance, said connecting means including an arcuate slot defined by one of said backing plate and lever, said connecting means further including a pin carried by the other of said backing plate and lever, said pin being slidably and rotatably received in said slot, the curvature of said slot coinciding with an arc substantially centered at said anchor pin.

* * * * *